Feb. 26, 1952  A. E. RUTTER  2,587,387
DISK HARROW LOCKING DEVICE
Filed Dec. 15, 1945  3 Sheets-Sheet 1

INVENTOR
Alvah E. Rutter
BY Emerson B. Donnell
ATTORNEY

Feb. 26, 1952 A. E. RUTTER 2,587,387
DISK HARROW LOCKING DEVICE
Filed Dec. 15, 1945 3 Sheets-Sheet 2

INVENTOR
Alvah E Rutter
BY
Emerson B Donnell
ATTORNEY

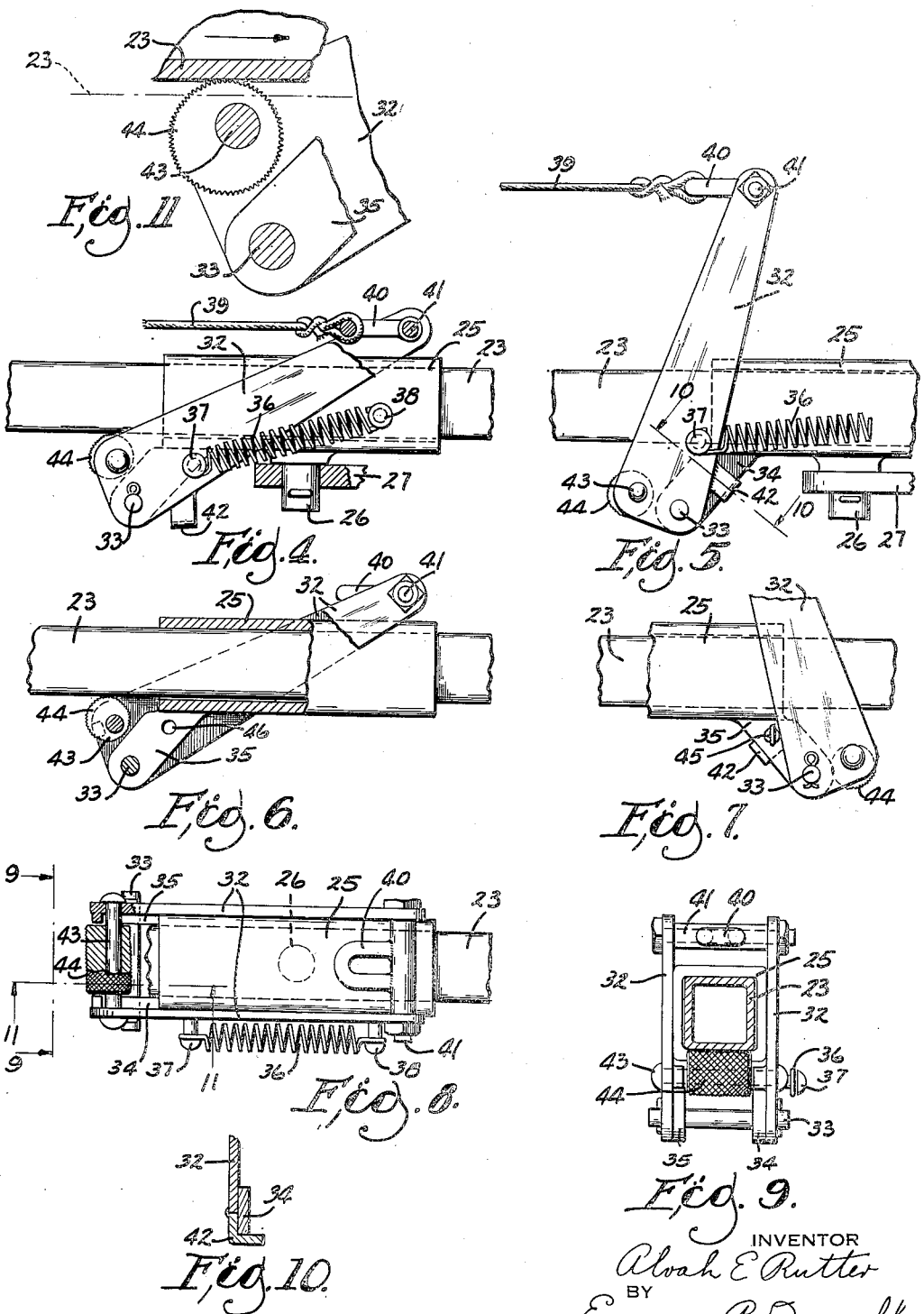

Patented Feb. 26, 1952

2,587,387

UNITED STATES PATENT OFFICE 2,587,387

DISK HARROW LOCKING DEVICE

Alvah E. Rutter, Rockford, Ill., assignor to J. I. Case Company, Racine, Wis., a corporation of Wisconsin Application December 15, 1945, Serial No. 635,233

6 Claims. (Cl. 55—81)

The present invention relates to disk harrows and more particularly to locking mechanism for disk harrows of the offset type for securing such harrows in desired position and an object of the invention is to generally improve the construction and operation of devices of this class.

Harrows of this description commonly trail a tractor in a position offset from the center line of the tractor so as to cultivate under overhanging branches of fruit trees and the like and comprise a single pair of disk gangs pivotally connected together so as to form an acute angle to each other when in working position, being disposed somewhat in the form of a V. As is wellknown, these harrows will travel straight and will turn satisfactorily toward the closed end or apex of the V but will give trouble if it is attempted to turn toward the open end of the V unless the harrow is "closed," the gangs being brought into substantially parallel relation. The gangs must therefore be free to close at any time that such a turn is made and a further object of the invention is to provide a locking device which will provide for such closing movement of the harrow at any time.

Further objects are to provide such a device which will lock against opening movement in any position within the limits of adjustment of the harrow, which will release easily, which will hold the harrow securely in adjusted position and which is easily and economically manufactured.

Further objects and advantages will be apparent from the following specification and accompanying drawings in which a satisfactory embodiment of the invention is shown. However, it is to be understood that the invention is not limited to the details disclosed but includes all such variations and modifications as fall within the spirit of the invention as herein expressed.

In the drawings, Figure 1 is a plan view of an offset disk harrow embodying the invention, the gangs being in closed or parallel position.

Fig. 4 is an enlarged detail of certain mechanism including a locking lever indicated in Fig. 3.

Fig. 5 is a similar view showing the lever in a tripped or disengaged position.

Fig. 6 is a view similar to Fig. 4 with parts broken away.

Fig. 7 is a view similar to Fig. 4 showing the opposite side of the locking lever.

Fig. 8 is a plan view of the mechanism indicated in Fig. 4 with parts broken away.

Fig. 9 is a sectional view taken on the line 9—9 of Fig. 8.

Fig. 10 is a sectional view on the line 10—10 of Fig. 5.

Fig. 11 is a vertical section on line 11—11 of Fig. 8.

Similar reference characters have been applied to the same parts throughout the specification and drawings.

Figure 1:
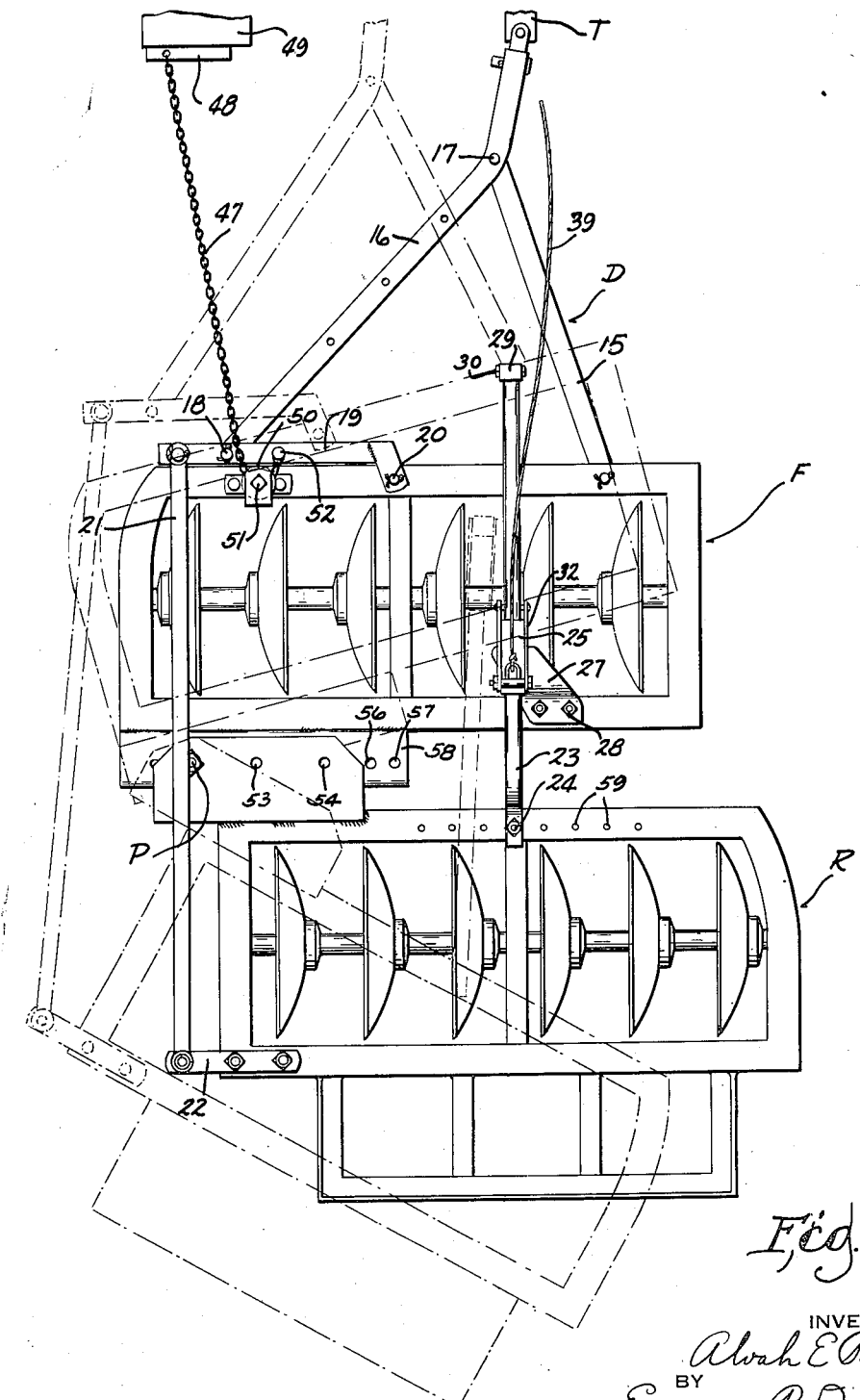
Figure 3:
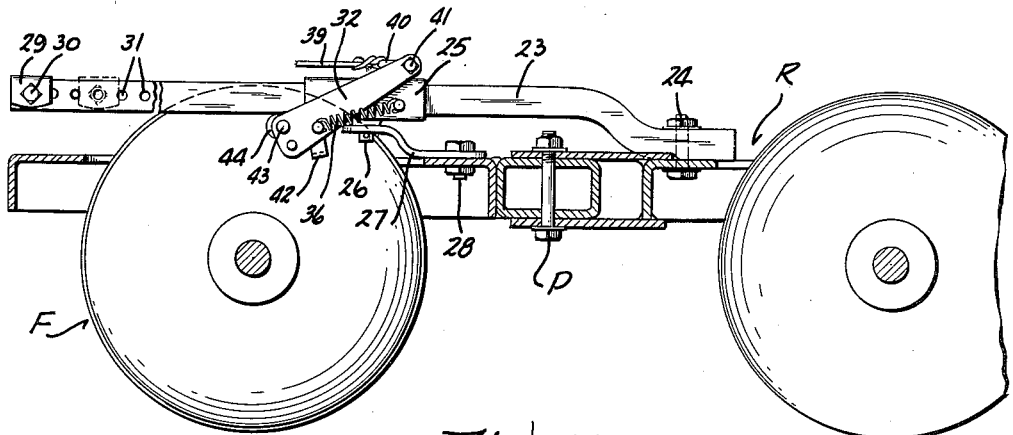
Fig. 3 is a vertical sectional view taken on line 3—3 of Fig. 2.
Figure 2:
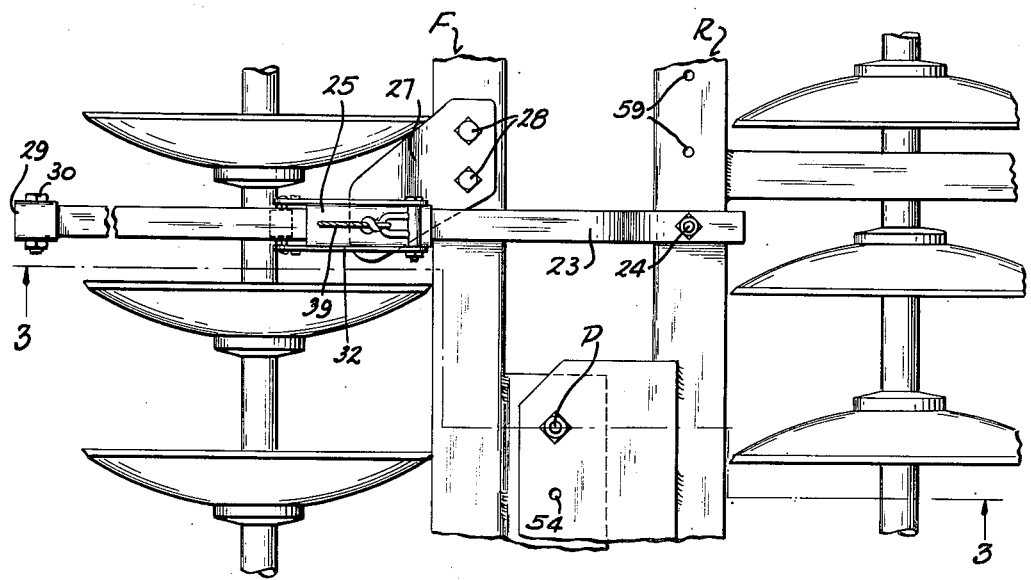
Fig. 2 is an enlarged plan view of a portion of Fig. 1.

As seen in Fig. 1, the harrow to which the invention is applied comprises a front gang generally designated as F and a rear gang generally designated as R, the gangs being pivoted by means of a pivot P, the draw bar generally designated as D being connected to front gang F and adapted for attachment to a tractor draw bar T.

Draw bar D comprises portions 15 and 16 pivotally connected at 17, portion 16 being pivotally connected at 18 to a lever 19 pivoted to front gang F at 20. Lever 19 is also connected through a link 21 to a bracket 22 fixed in relation to rear gang R, the result of a pull by tractor T being to tend to swing gang F in a counterclockwise direction and gang R in a clockwise direction as seen in Fig. 1 in a manner well-known and set forth in applicant's prior Patent 2,404,252, dated July 16, 1946.

As hereinbefore stated, these harrows can be readily caused to travel in an offset position as related to the tractor and are commonly so used, the parts then taking the positions indicated in dotted lines in Fig. 1, lever 19 being angled forwardly from gang F. It is necessary to control the degree of angle and for this purpose a stay bar 23 in the present instance is pivoted at 24 to gang R and slidable through a sleeve 25 pivoted at 26 to a bracket 27 fixed at 28 to gang F. In view of the pivotal connections at 24 and 26, the device as so far described can freely open and close, bar 23 sliding through sleeve 25. The angling movement, however, is limited by a stop 29 fixed at any one of a number of positions for example by a bolt 30 engageable in openings 31—31. When stop 29 encounters sleeve 25 it will be apparent that further opening movement of the harrow is prevented and a working angle is determined.

The arrangement of the various pivots and levers is such that the harrow tends to open when propelled forwardly. However, when it is desired to transport the implement from field to field, such opening is not desirable and the harrow is accordingly held in closed position as seen in Fig. 1 by means of the stay bar 23. For this purpose, bar 23 is clamped in relation to sleeve 25. As seen in Figs. 4 to 11 inclusive, a bifurcated lever 32 is pivoted on a pin or the like 33 carried by downwardly and forwardly extending ears 34 and 35 suitably fastened to sleeve 25. Lever 32 is continuously urged in a clockwise direction as seen in Figs. 4 to 6 by a spring 36 anchored to a pin 37 on lever 32 and a pin 38 on sleeve 25. Lever 32 may be rocked forwardly or in a counterclockwise direction by a rope or the equivalent 39 extended from the propelling vehicle and connected to a fitting 40 pivoted at 41 to lever 32. Excessive movement of lever 32 is prevented by a stop or abutment 42 fixed to the lever and engaging a portion of above mentioned ear 34. Lever 32 has a pin 43 on which is eccentrically journaled a roller 44. Roller 44 preferably has a roughened or knurled surface so as to make good frictional contact with the surface of bar 23 and pin 43 is so located relatively to pivot 33 that roller 44 is normally pressed into contact with bar 23 as best shown in Figs. 4, 6 and 9. Therefore, with the parts in the position of Fig. 4, movement toward the right of bar 23 tends to swing lever 32 further in a clockwise direction and to press roller 44 more forcibly against stay bar 23.

It is thus possible to transport the harrow by means of draw bar D with the sections closed without any tendency of the harrow to open or go into working position.

When it is desired to again assume working position, a pull on rope 39 swings lever 32 from the Fig. 4 to the Fig. 5 position, removing roller 44 from contact with stay bar 23. The harrow is then free to open toward the dotted position of Fig. 1 since stay bar 23 can now slide freely through sleeve 25. The opening movement will terminate when sleeve 25 and stop 29 come together, the adjusted position of stop 29 determining the angled position of the harrow. If it is desired to achieve an angled position less than that for which stop 29 is set, rope 39 may be pulled momentarily when the harrow is going forward in closed position, but released before the full angled position is reached. Roller 44 will then take up against stay bar 23 holding the harrow in the new angled position.

In locking mechanisms of this general type, difficulty has heretofore been experienced because of a wedging action between the bar and the clamping element, the locking means becoming so tightly clamped that it is difficult, if not impossible, to release. In the present instance, roller 44 may turn slightly on its pin 43 during the period while lever 32 is beginning its releasing movement. For this reason, the locking means does not become wedged and no difficulty is experienced in releasing it when desired.

Roller 44, while freely journaled on pin 43, is eccentric thereto so that rotation of roller 44 by reason of relative backward movement of stay bar 23, will not be possible beyond a small amount sufficient to generate locking pressure between roller 44 and bar 23. The backward travel of lever 32 is made sufficient so that roller 44 will always contact bar 23 when lever 32 is released. It will be noted that the tendency of eccentric roller 44 to be rolled by bar 23 will exert a rocking force on lever 32 in a direction to move lever 32 toward releasing position. However, lever 32 moves far enough so that fulcrum 33, pin 43 and the point of contact between roller 44 and bar 23 approach a common plane in the locked position of the parts. Therefore, the force developed by eccentric roller 44 tending to move lever 32 in a releasing direction either disappears entirely or becomes so slight as to be easily resisted by spring 36.

The parts therefore remain in locked position in a reliable manner until such time as they are released by a pull on rope 39. However, upon any tendency of bar 23 to move in a relatively forward direction (left in Figs. 4 to 7) roller 44 is carried in this direction and lever 32 moved sufficiently to release the parts from locked position. Bar 23 may then move freely, roller 44 sliding or rolling on the surface thereof.

If it is desired to free bar 23, for sliding movement in either direction through sleeve 25, as might be desirable for example when cultivating where numerous right turns are necessary, lever 32 may be released and a pin 45 placed in an opening 46 whereupon the released position of the parts will be maintained.

Various mechanisms are known for automatically closing harrows of this general type for turning to the right or toward the open side. In the present illustrative embodiment, a chain or similar flexible tension member 47 is connected to a bracket or the like 48 on the left fender or other suitable part 49 of the tractor. Chain 47 passes about a sheave 50 journaled on a pin 51 on front frame F. The chain then passes forwardly and is fastened to an anchorage 52 on above mentioned lever 19. As explained in the above identified patent application, Serial No. 426,081, now Patent No. 2,404,252, dated July 16, 1946, a right turn on the part of tractor T first tensions chain 47 which exerts a forward pull on pin 51 and a backward force on lever 19. Lever 19, through above mentioned link 21, pushes backwardly on rear gang R to the left of pivot P. Frame F is therefore rotated clockwise in Fig. 1 while frame R is rotated counterclockwise. This movement is freely permitted by movement of stay bar 23 through sleeve 25 unopposed by locking roller 44 as above explained. This brings the harrow into the full line position of Fig. 1 which is satisfactory for a right turn or for transportation. When the turn is completed, however, and it is desired to continue cultivating, it is necessary to pull rope 39 to release stay bar 23 so that the harrow may again go into angle.

Pivot P may be removed and replaced in a series of openings as 53 and 54 in a plate 55. Openings 53 and 54 may register with any of openings 56 and 57 in a plate 58 so that the relative position of frames F and R may be changed as necessary for different conditions. In like manner, pivot 24 may be engaged in any one of holes 59 in frame R so as to position bar 23 in an advantageous relation to the frames regardless of the relative adjustment between the frames.

The operation of the invention is thought to be clear from the above description, it being noted that the harrow is adapted to automatically close upon negotiation of a right turn or upon backing of the tractor and that it will remain closed until a pull is exerted on trip rope 39 while driving forward. The closing however is not dependent on attention by the operator but is freely possible at all times. The harrow goes into a predetermined angle whenever trip rope 39 is pulled. This occurs without special attention on the part of the operator. On the other hand, the locking device may be readily put out of action when conditions require, by the use of above mentioned pin 45.

It will now be apparent that expedients have been provided for the realization of the objects recited and what is claimed as new and desired to be secured by Letters Patent of the United States is:

1. In a clamping device, the combination of a bar, a sleeve through which said bar is slidable and means for clamping the bar at any point within the sleeve including a lever swingable toward said bar and pivotally supported at a fixed point relatively to said sleeve, and a roller eccentrically journaled on said lever and having a surface engaging said bar in one position of said lever, and means for urging said lever in a direction to cause engagement between said roller and said bar.

2. In a clamping device, the combination of a bar, a sleeve through which said bar is slidable and means for clamping the bar at any point within the sleeve including a lever swingable toward said bar and pivotally supported at a fixed point relatively to said sleeve, and a roller eccentrically journaled on said lever and having a surface engaging said bar in one position of said lever, means for urging said lever in a direction to cause engagement between said roller and said bar, and manually actuated means for actuating said lever in a direction for disengaging said roller from said bar.

3. In a clamping device, the combination of a bar, a sleeve through which said bar is slidable, and means for clamping the bar at any point within the sleeve including a lever swingable toward said bar and pivotally supported at a fixed point relatively to said sleeve, said lever having a portion engaging said bar in one position of said lever, means for urging said lever in a direction to cause engagement between said portion and said bar and removable stop means positioned to engage said lever to maintain it in a position such that said portion is disengaged from said bar.

4. In a clamping device, the combination of an elongated element, a portion with relation to which said element is longitudinally movable, and means for clamping said element at any point relatively to said portion, including a lever swingable toward said portion and pivotally supported at a fixed point relatively to said portion, and a roller eccentrically journaled on said lever and having a surface engaging said element in one position of said lever, and means for urging said lever in a direction to cause engagement between said roller and said longitudinally movable element.

5. In a stay bar structure for use with a disk harrow of the type comprising a plurality of gangs hinged for movement between an open working position and a closed transport and turning position; said stay bar structure comprising the combination of an elongated element, a portion with relation to which said element is longitudinally movable, and means for clamping said element at any point relatively to said portion, including a lever swingable toward said portion and pivotally supported at a fixed point relatively to said portion, and a roller eccentrically journaled on said lever and having a surface engaging said element in one position of said lever, and means for urging said lever in a direction to cause engagement between said roller and said longitudinally movable element.

6. In a stay bar structure for use with a disk harrow of the type comprising a plurality of gangs hinged for movement between an open working position and a closed transport and turning position, and including means for closing said gangs for turning; said stay bar structure comprising the combination of an elongated element, a portion with relation to which said element is longitudinally movable, and means for clamping said element at any point relative to said portion, including a member movable toward and away from said elongated element in a path generally in the direction of movement of and toward said element, a part having a cam surface engageable with said elongated element, said part being pivoted, eccentrically to said cam surface, on said movable element, and means for urging said movable member in the direction to cause engagement between said cam surface and said elongated element.

ALVAH E. RUTTER.

REFERENCES CITED

The following references are of record in the file of this patent:

UNITED STATES PATENTS

| Number | Name | Date |
|--------|------|------|
| 625,020 | Chappuis | May 16, 1899 |
| 1,245,683 | Clasen et al. | Nov. 6, 1917 |
| 2,152,928 | Sjogren et al. | Apr. 4, 1939 |
| 2,396,813 | Benz | Mar. 19, 1946 |